United States Patent
Böckem et al.

(10) Patent No.: US 10,054,422 B2
(45) Date of Patent: Aug. 21, 2018

(54) COORDINATE MEASURING DEVICE

(71) Applicant: LEICA GEOSYSTEMS AG, Heerbrugg (CH)

(72) Inventors: Burkhard Böckem, Rieden AG (CH); Daniel Moser, Seengen (CH); Simon Fuchs, Schöftland (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 499 days.

(21) Appl. No.: 14/813,003

(22) Filed: Jul. 29, 2015

(65) Prior Publication Data
US 2016/0033258 A1 Feb. 4, 2016

(30) Foreign Application Priority Data
Jul. 30, 2014 (EP) .................................. 14179139

(51) Int. Cl.
*G01C 3/08* (2006.01)
*G01B 11/00* (2006.01)
*G01S 17/66* (2006.01)
*G01B 21/04* (2006.01)

(52) U.S. Cl.
CPC .......... *G01B 11/005* (2013.01); *G01B 21/042* (2013.01); *G01S 17/66* (2013.01)

(58) Field of Classification Search
CPC ...... G01B 11/005; G01B 21/042; G01S 17/66
See application file for complete search history.

(56) References Cited

U.S. PATENT DOCUMENTS

| 4,062,634 A * | 12/1977 | Rando ................... G01L 311/26 356/149 |
|---|---|---|
| 5,973,788 A | 10/1999 | Pettersen et al. |
| 7,209,225 B2 | 4/2007 | Inoue |
| 8,031,331 B2 | 10/2011 | Meier et al. |
| 8,537,376 B2 | 9/2013 | Brown et al. |
| 8,638,446 B2 | 1/2014 | Briggs |
| 9,696,140 B2 | 7/2017 | Markendorf et al. |
| 2008/0235970 A1 | 10/2008 | Crampton |

(Continued)

FOREIGN PATENT DOCUMENTS

| CH | 706 633 A2 | 12/2013 |
|---|---|---|
| CN | 103003713 A | 3/2013 |

(Continued)

OTHER PUBLICATIONS

European Search Report dated Feb. 19, 2015 as received in Application No. 14 17 9139.

Primary Examiner — Samantha K Abraham
(74) Attorney, Agent, or Firm — Maschoff Brennan

(57) ABSTRACT

Some embodiments of the invention include a coordinate measuring device, in particular a laser tracker, for capturing the position and alignment of a measuring aid, which is movable in space and comprises a retroreflector. In some embodiments, the coordinate measuring device may include at least a support fastened on a base so it is rotatable about a first axis of rotation; a beam deflection unit fastened on the support so it is rotatable about a second axis of rotation, which is essentially orthogonal to the first axis of rotation, a first bearing for the rotatable mounting of the beam deflection unit on the support, and a second bearing for the rotatable mounting of the support on the base.

18 Claims, 12 Drawing Sheets

(56) References Cited

U.S. PATENT DOCUMENTS

| | | | |
|---|---|---|---|
| 2013/0301095 A1* | 11/2013 | Zhang | G02B 26/0841 |
| | | | 359/200.6 |
| 2014/0211999 A1 | 7/2014 | Kwiatkowski | |
| 2015/0002857 A1 | 1/2015 | Fäs et al. | |
| 2015/0009493 A1 | 1/2015 | Kwiatkowski et al. | |
| 2015/0043007 A1 | 2/2015 | Kwiatkowski et al. | |
| 2015/0077544 A1 | 3/2015 | Lüscher et al. | |
| 2016/0252619 A1 | 9/2016 | Markendorf et al. | |

FOREIGN PATENT DOCUMENTS

| | | | | |
|---|---|---|---|---|
| CN | 103649673 A | | 3/2014 | |
| EP | 0 553 266 B1 | | 5/1997 | |
| EP | 2 557 391 A1 | | 2/2013 | |
| EP | 2 607 843 A1 | | 6/2013 | |
| EP | 2602641 A1 | | 6/2013 | |
| EP | 2 618 175 A1 | | 7/2013 | |
| EP | 2 634 594 A1 | | 9/2013 | |
| EP | 2 639 615 A1 | | 9/2013 | |
| EP | 2 687 866 A1 | | 1/2014 | |
| EP | 2 698 602 A1 | | 2/2014 | |
| EP | 2 746 806 A1 | | 6/2014 | |
| EP | 2 746 807 A1 | | 6/2014 | |
| EP | 2746807 A1 * | | 6/2014 | G01S 17/06 |
| EP | 2827099 A1 | | 1/2015 | |
| JP | 2012-103113 A | | 5/2012 | |
| WO | 03/062744 A1 | | 7/2003 | |
| WO | 2007/079600 A1 | | 7/2007 | |
| WO | 2013/114466 A1 | | 8/2013 | |

\* cited by examiner

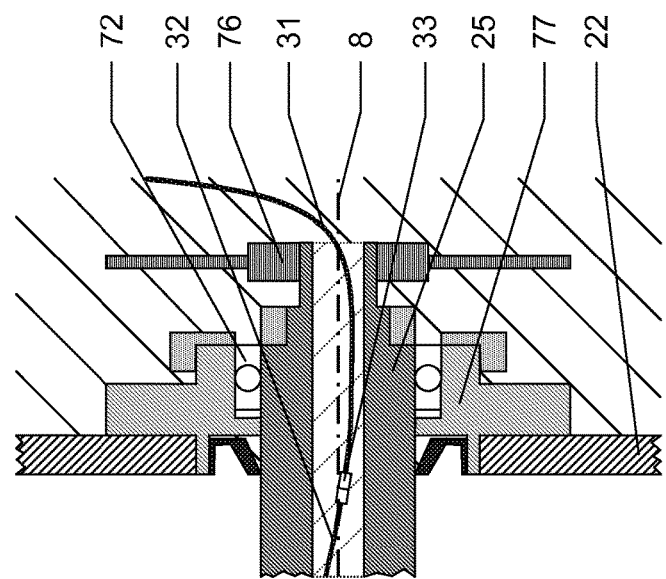
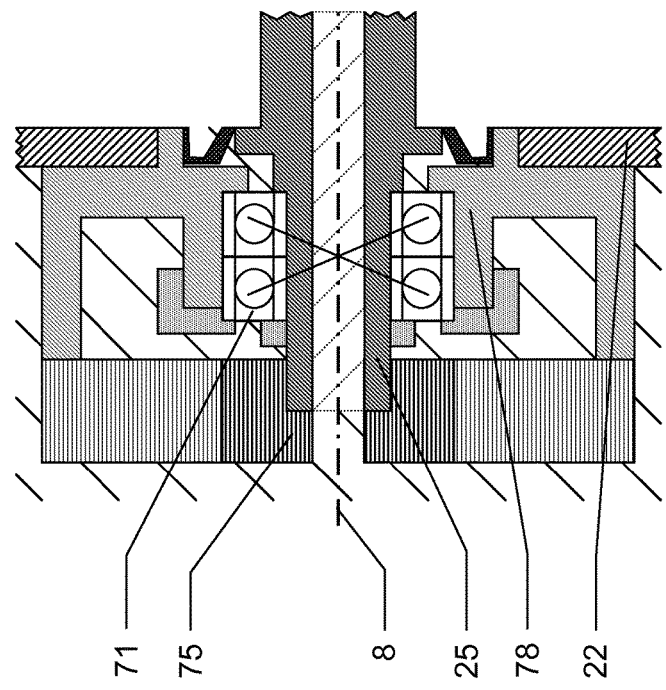
Fig. 9a
Fig. 9b

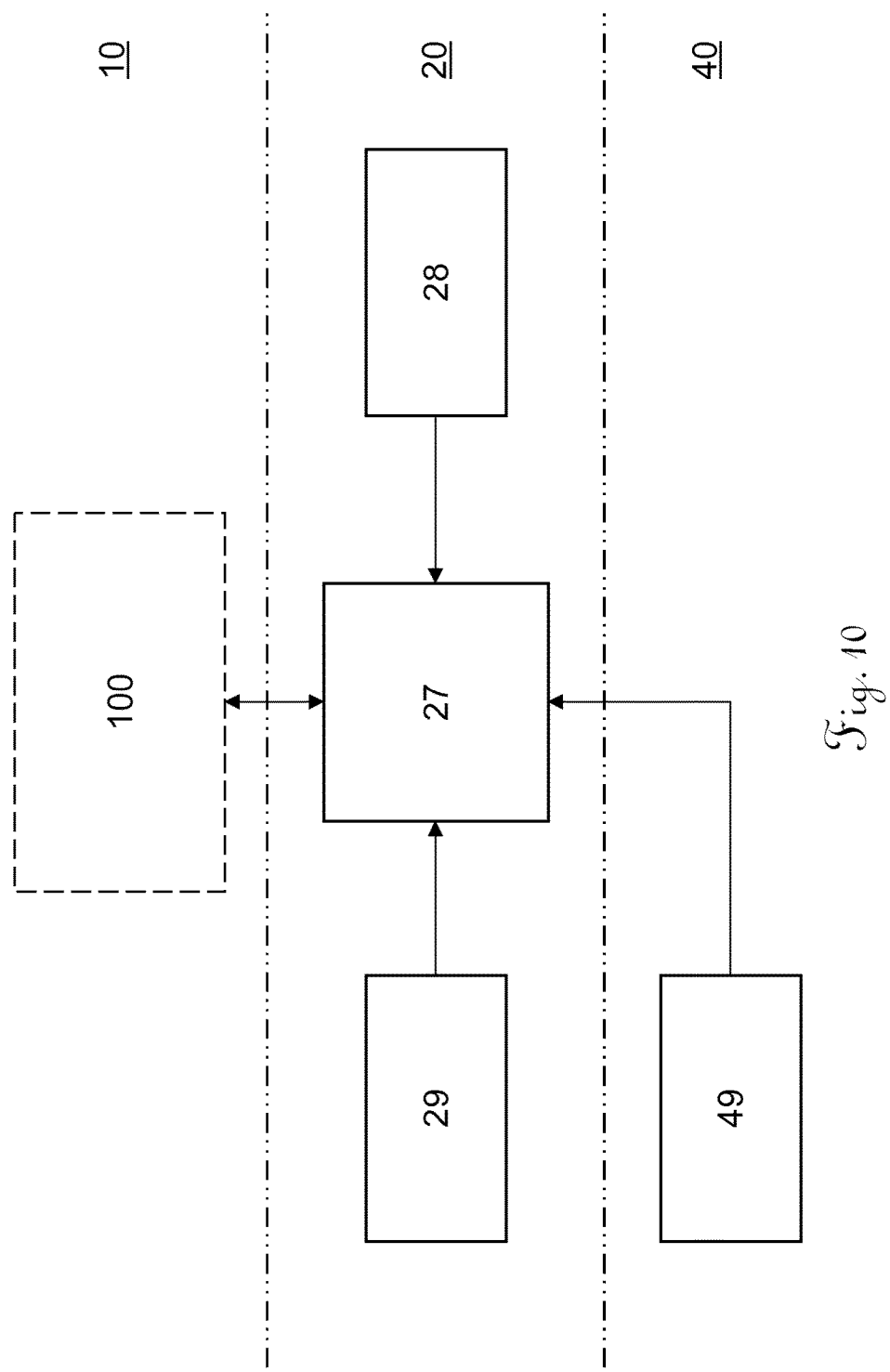

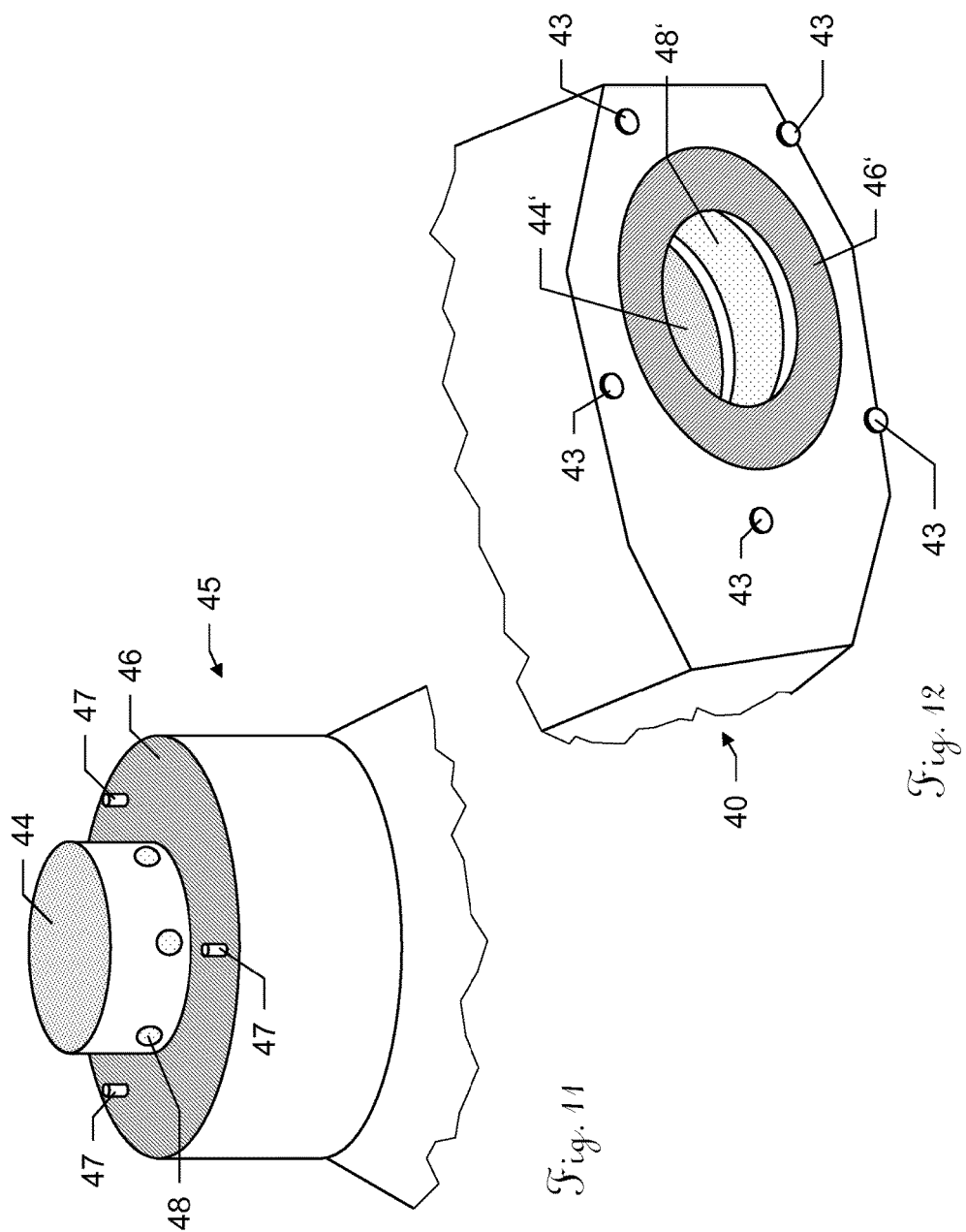

COORDINATE MEASURING DEVICE

FIELD OF THE INVENTION

The invention relates to coordinate measuring devices, embodied in particular as laser trackers, for surveying coordinates on surfaces of target objects.

BACKGROUND

Measuring devices, which are designed for progressive tracking of a target point and a coordinate position determination of this point, can generally, in particular in conjunction with industrial surveying, be summarized under the term laser trackers. A target point can be represented in this case by a retroreflective unit (for example, a cube prism), which is targeted using an optical measurement beam of the measuring device, in particular a laser beam. The laser beam is reflected in parallel back to the measuring device, wherein the reflected beam is captured using a capture unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the capture of the beam, for example, by means of runtime or phase difference measurement or by means of the Fizeau principle.

Laser trackers according to the prior art can additionally be embodied having an optical image capture unit having a two-dimensional, light-sensitive array, for example, a CCD or CID camera or a camera based on a CMOS array, or having a pixel array sensor and having an image processing unit. The laser tracker and the camera can be installed one on top of another in this case, in particular in such a manner that the positions thereof in relation to one another are not variable. The camera is, for example, rotatable together with the laser tracker about its essentially perpendicular axis, but is pivotable up-and-down independently of the laser tracker and is therefore arranged separately from the optics system of the laser beam in particular. Furthermore, the camera—for example, in dependence on the respective application—can be embodied as pivotable about only one axis. In alternative embodiments, the camera can be installed in an integrated construction together with the laser optic in a shared housing.

With the capture and analysis of an image—by means of image capture and image processing unit—of a so-called measuring aid instrument having markings, the relative locations of which to one another are known, an orientation of an object (for example, a probe), which is arranged on the measuring aid instrument, in space can be concluded. Together with the determined spatial position of the target point, furthermore the position and orientation of the object in space can be precisely determined absolutely and/or in relation to the laser tracker.

The object, the position and orientation of which is surveyed using the mentioned measuring device, therefore does not have to be a measuring probe itself, for example, but rather can be the measuring aid. It is brought into a position, as part of the measurement system for the surveying, which is mechanically defined in relation to the target object or is determinable during the surveying, wherein the position and optionally the orientation of the measuring probe, for example, can be concluded via its surveyed position and orientation.

Such measuring aid instruments can be embodied by so-called scanning tools, which are positioned having the contact point thereof on a point of the target object. The scanning tool comprises markings, for example, light spots, and a reflector, which represents a target point on the scanning tool and can be targeted using the laser beam of the tracker, wherein the positions of the markings and the reflector in relation to the contact point of the scanning tool are precisely known. The measuring aid instrument can also be, in a way known to a person skilled in the art, a handheld scanner equipped for distance measurement, for example, for contactless surface surveying, wherein the direction and position of the scanner measurement beam used for the distance measurement are precisely known in relation to the light spots and reflectors which are arranged on the scanner. Such a scanner is described, for example, in EP 0 553 266.

Laser trackers of the prior art comprise at least one distance meter for distance measurement, wherein it can be designed as an interferometer, for example. Since such distance measuring units can only measure relative distance changes, so-called absolute distance meters are installed in addition to interferometers in current laser trackers. The interferometers used in this context for the distance measurement primarily use—because of the long coherence length and the measurement range thus enabled—HeNe gas lasers as light sources. The coherence length of the HeNe laser can be several hundred meters in this case, so that the ranges required in industrial metrology can be achieved using relatively simple interferometer structures. A combination of an absolute distance meter and an interferometer for distance determination using a HeNe laser is known, for example, from WO 2007/079600 A1.

In addition, in modern tracker systems, a deviation of the received measurement beam from a zero position is ascertained on a fine targeting sensor—increasingly as a standard feature. By means of this measurable deviation, a position difference between the center of a retroreflector and the point of incidence of the laser beam on the reflector can be determined and the alignment of the laser beam can be corrected or tracked as a function of this deviation such that the deviation on the fine targeting sensor is decreased, in particular is "zero", and therefore the beam is aligned in the direction of the reflector center. By way of the tracking of the laser beam alignment, progressive target tracking (tracking) of the target point can be performed and the distance and position of the target point can be progressively determined in relation to the measuring device. The tracking can be implemented in this case by means of an alignment change of the deflection mirror, which is movable by a motor, provided for deflecting the laser beam and/or by a pivot of the targeting unit, which comprises the beam-guiding laser optic.

For the determination of the orientation of the measuring aid, a capture direction of the camera is progressively aligned so that an image can be captured in the direction of the tracking beam of the laser tracker. The camera can furthermore have a zoom function, wherein an enlargement step can be set in dependence on the determined distance between laser tracker and target point or measuring aid. Using these two adaptation functions (alignment and enlargement), the camera can therefore progressively capture an image in which the measuring aid and in particular the light spots of the measuring aid are imaged. A two-dimensional image, which can be electronically analyzed, of a spatial arrangement of light spots thus results.

An image processing unit is provided for analyzing the image. An identification of the imaged light spots, a determination of the focal points of the imaged light spots, and a determination of the image coordinates of these focal points can be performed thereby, from which, for example, spatial angles between the optical axis of the sensor, in particular the capture direction, and the direction from the sensor to the respective light spots can be calculated.

Such a coordinate measuring device having a laser tracker and an image capture unit for the determination of position and orientation of objects in space, on which light spots and reflectors are arranged, is described, for example, in U.S. Pat. No. 5,973,788.

During the use of such coordinate measuring devices, at least three light spots, which can be registered by the image capture unit, and at least one reflector, which reflects the measurement beam of the laser tracker, are arranged on the object, the position and orientation of which is to be determined, in positions known in relation to the object. The light spots to be registered by the image capture unit can be active light sources (for example, light-emitting diodes) or reflectors to be illuminated, wherein the light spots are equipped or arranged such that they can be unambiguously differentiated from one another.

A laser-based coordinate measuring device of the type in question is disclosed in WO 2007/079600 A1, in which a light exit and light receiving optics system of the distance measuring device, a measurement camera, and an overview camera are arranged on a shared element, which is rotatable with respect to at least two axes, and a laser beam is coupled by means of an optical waveguide from a laser module, which is attached outside the beam deflection unit, into the distance measuring device.

Laser-based coordinate measuring devices of the type in question generally have an electronic inclination sensor, which is integrated in a stationary base or a support of the device, which is rotatable about the standing axis.

These inclination sensors are capable of measuring an angle in relation to the vertical direction. They do not only assume the function of a height compensator for the vertical circle, but rather also monitor the inclination of the standing axis in both directions for horizontal leveling and monitoring of the stability during the measurement. By means of angle encoders on the axes of the device, an inclination of the beam deflection unit can thus also be ascertained indirectly, whereby a base coordinate system of the measurement system can be aligned in relation to the vertical direction.

In particular in the case of applications which require high-precision measurements, an inclination sensor provided in the base sometimes cannot provide sufficiently precise specifications about the present inclination of the beam deflection unit. Thus, even in the case of minor deviations between stationary base and rotatable support from a standard alignment, exact values can no longer be supplied. An inclination sensor integrated in the movable support can no longer deliver reliable specifications on the vertical direction during rotational movements of the support, in contrast, so that, for example, a lateral inclination occurring during the measurement or wobbling of the device as a result of uneven ground remains unrecognized, whereby the measurement results are corrupted.

SUMMARY

Some embodiments of the invention provide a coordinate measuring device of the type mentioned at the outset, which improves precision and reliability of the measurement in relation to the prior art.

Some embodiments of the invention provide such a coordinate measuring device which enables an ascertainment of the inclination of the beam deflection unit with higher precision and with lower susceptibility to error than the prior art.

Some embodiments of the invention provide such a coordinate measuring device which enables a continuous ascertainment of the inclination of the beam deflection unit also during the measurement.

According to the invention, a coordinate measuring device comprises two inclination sensors, of which one is provided in a stationary base of the device and the other is provided in a rotatable support. A direction of the measurement radiation can be determined more precisely and reliably by analyzing the inclination data generated by the sensors. The inclination data can additionally be used for checking and optionally calibrating measurement parameters, and for checking and optionally calibrating a bearing between the base and the support.

A coordinate measuring device, in particular a laser tracker, for capturing the position and alignment of a measuring aid, which is movable in space and comprises a retroreflector, this coordinate measuring device at least comprising a support, which is fastened on a base so it is rotatable about a first axis of rotation, a beam deflection unit, which is fastened on the support so it is rotatable about a second axis of rotation, which is essentially orthogonal to the first axis of rotation, a first bearing for the rotatable mounting of the beam deflection unit on the support, and a second bearing for the rotatable mounting of the support on the base, wherein the beam deflection unit comprises an optical distance measuring device having at least one distance meter for measuring the distance to the measuring aid by means of measurement radiation, the first bearing comprises a first angle encoder and the second bearing comprises a second angle encoder, and a first inclination sensor is provided on the base, is characterized according to the invention by a second inclination sensor on the support, wherein the first inclination sensor and the second inclination sensor are each embodied to capture an inclination in at least two essentially orthogonal directions in relation to the direction of gravity and to output inclination data, and by an analysis and control unit, which is embodied, for the purpose of self-monitoring and/or self-calibration of the coordinate measuring device, to capture and analyze the inclination data of the two inclination sensors.

In a preferred embodiment, the coordinate measuring device comprises a tracking functionality for the progressive tracking of the measuring aid, in particular wherein a first position-sensitive surface detector is provided in the beam deflection unit.

In a further embodiment of the coordinate measuring device, the beam deflection unit comprises a measurement camera for capturing the spatial alignment of the measuring aid and/or at least one first localization camera for coarse localization of the measuring aid.

In one embodiment, the coordinate measuring device comprises a handle as a connecting element of a first and a second spar of the support, wherein the handle does not touch the first axis of rotation, in particular wherein the handle is bent or has an opening, so that a measurement of the distance to a target along the first axis of rotation is enabled.

In a further embodiment of the coordinate measuring device, the first and the second inclination sensors are precision inclination sensors having a usage range of ±1.5 mrad to ±3.0 mrad, a precision of +/−0.004 mrad to +/−0.04 mrad, and a resolution of 0.0005 mrad to 0.0015 mrad.

In a further embodiment of the coordinate measuring device, the analysis and control unit is embodied to capture inclination data of the two inclination sensors simultaneously and correlate them with one another, in particular to ascertain differences between simultaneously captured inclination data.

In a further embodiment of the coordinate measuring device, the analysis and control unit is embodied to capture inclination data of the two inclination sensors independently of one another and correlate them with one another.

In a further embodiment, the coordinate measuring device is embodied to execute a measurement sequence, in the scope of which the support is rotated in relation to the base by means of a first motor about the first axis of rotation, wherein the analysis and control unit is embodied,
  before the measurement sequence, to capture inclination data of the two inclination sensors and correlate them with one another as initialization inclination data; and
  during the measurement sequence, to capture inclination data of the second inclination sensor and to correlate them with the initialization inclination data for the purpose of self-monitoring and/or self-calibration of the coordinate measuring device during the measurement sequence.

In one embodiment, the coordinate measuring device comprises a calibration device for use with a self-calibration functionality, in the scope of which calibration parameters are determinable with respect to a position and/or direction of the measurement radiation, wherein analyzed inclination data are also used for the self-calibration functionality.

In a further embodiment, the coordinate measuring device comprises a meteorology station having sensors for ascertaining a temperature, a pressure, and/or a humidity of ambient air, in particular in the support or in the base, wherein the meteorology station is embodied to output the ascertained data as environmental data, and the analysis and control unit is also embodied to capture and analyze the environmental data.

A further embodiment of the coordinate measuring device is characterized in that analyzed environmental data are also usable for the self-calibration functionality.

In one embodiment of the coordinate measuring device, the calibration device comprises a second position-sensitive surface detector on the base, onto which measurement radiation can be emitted from the beam deflection unit, and the analysis and control unit is embodied to determine a point of incidence of measurement radiation incident on the second position-sensitive surface detector.

In another embodiment of the coordinate measuring device, the calibration device comprises a retroreflector, which is designed, in a two-dimensional region, independently of the point of incidence of the measurement radiation within the two-dimensional region, to generate an offset-free, coaxial retroreflection of measurement radiation incident thereon.

In a further embodiment of the coordinate measuring device, the calibration device comprises, on the base, a retroreflector and an optics assembly acting as a reducing objective, and, to determine the calibration parameters for the coordinate measuring device, can be targeted using the measurement radiation such that an optical beam path of the measurement radiation extends through the optics assembly and the measurement radiation is incident on the retroreflector, whereby a first calibration measurement can be carried out using a distance to the retroreflector which is simulated with respect to relevant measured variables for the determination of the calibration parameters, and the simulated distance is greater than an actual structurally provided distance to the retroreflector.

In one embodiment of the coordinate measuring device, the calibration device is designed to calibrate at least the second angle encoder at least by means of the inclination data.

In a further embodiment of the coordinate measuring device, the first bearing and/or the second bearing is/are embodied as fixed/free bearings.

In one embodiment, the coordinate measuring device comprises a laser module, in particular a helium-neon laser module, for generating a laser beam as measurement radiation, in particular wherein the laser module is provided in the support, and an in particular polarization-maintaining, optical waveguide system for transmitting light between the support and the beam deflection unit, in particular for coupling a laser beam of the laser module into the optical distance measuring device, in particular wherein the optical waveguide system comprises a first fiber and a second fiber, which are connected to one another by a torsion-resistant plug connection, and/or the first and the second fibers are single-mode fibers.

The invention also comprises a method for measuring coordinates of a remote point by means of a coordinate measuring device, wherein the coordinate measuring device at least comprises
  a support, which is fastened on a base so it is rotatable about a first axis of rotation,
  a beam deflection unit, which is fastened on the support so it is rotatable about a second axis of rotation, which is essentially orthogonal to the first axis of rotation,
  a first bearing for the rotatable mounting of the beam deflection unit on the support, and
  a second bearing for the rotatable mounting of the support on the base,
wherein
  the beam deflection unit comprises an optical distance measuring device having at least one distance meter for measuring the distance to the measuring aid by means of measurement radiation,
  the first bearing comprises a first angle encoder and the second bearing comprises a second angle encoder, and
  a first inclination sensor is provided on the base,
and wherein the method comprises
  an emission of the measurement radiation onto the retroreflector,
  a reception of measurement radiation reflected from the retroreflector,
  an ascertainment of a distance to the retroreflector on the basis of the reflected measurement radiation,
  an ascertainment of an angle of the beam deflection unit in relation to the base, and
  a capture of an inclination of the base in at least two essentially orthogonal directions in relation to the direction of gravity by means of a first inclination sensor.

According to the invention, the method is characterized by a capture of an inclination of the support in at least two essentially orthogonal directions in relation to the direction of gravity by means of a second inclination sensor, wherein the ascertainment of the angle of the beam deflection unit in relation to the base comprises an analysis of the inclination of the base and the inclination of the support.

In one embodiment of the method, the inclination of the base and the inclination of the support are captured simultaneously and correlated with one another, and in particular differences between the simultaneously captured inclinations are ascertained.

In a further embodiment of the method, it comprises a measurement sequence, in the scope of which the support is rotated in relation to the base by means of a first motor about the first axis of rotation, wherein, by the analysis and control unit, before the measurement sequence, inclination data of the two inclination sensors are captured and correlated with one another as initialization inclination data; and during the measurement sequence, inclination data of the second inclination sensor are captured and correlated with the initialization inclination data for the purpose of self-monitoring and/or self-calibration of the coordinate measuring device during the measurement sequence.

A further aspect of the invention relates to a system for fastening the coordinate measuring device on a tripod having an integrated shock absorber unit.

A system according to the invention made of a coordinate measuring device and a quick-release fastener unit for fastening the coordinate measuring device on a tripod comprises at least one shock absorber for reducing shocks of the coordinate measuring device during a placement thereof on the quick-release fastener unit, wherein the shock absorber acts between the quick-release fastener unit and a base of the coordinate measuring device.

In one embodiment of the system made of coordinate measuring device and quick-release fastener unit, the quick-release fastener unit comprises a first contact surface and the coordinate measuring device comprises a base having a second contact surface, and the first contact surface and the second contact surface are embodied and arranged to contact one another over the entire surface after the placement. In this case, the shock absorber comprises a movable element for absorbing momentum, which protrudes out of the first contact surface or the second contact surface and is embodied to enable contacting over the entire surface of the first contact surface and the second contact surface after the placement. In particular, the movable element is a shock absorber piston rod, the shock absorber is hydraulic, and the system comprises at least three shock absorbers in this case.

BRIEF DESCRIPTION OF THE DRAWINGS

Further advantages and characteristics of the invention are apparent from the following description of presently preferred embodiments in conjunction with the appended figures. In the schematic figures:

FIGS. 9a-b show an exemplary embodiment of a fixed/free bearing of the beam deflection unit;

FIG. 10 shows an exemplary interaction of sensor units and optical unit with the analysis and control unit;

FIG. 11 shows an exemplary embodiment of a quick-release fastener on the tripod; and FIG. 12 shows an exemplary embodiment, corresponding to FIG. 11, of a quick-release fastener on the base.

DETAILED DESCRIPTION

Figure 1:
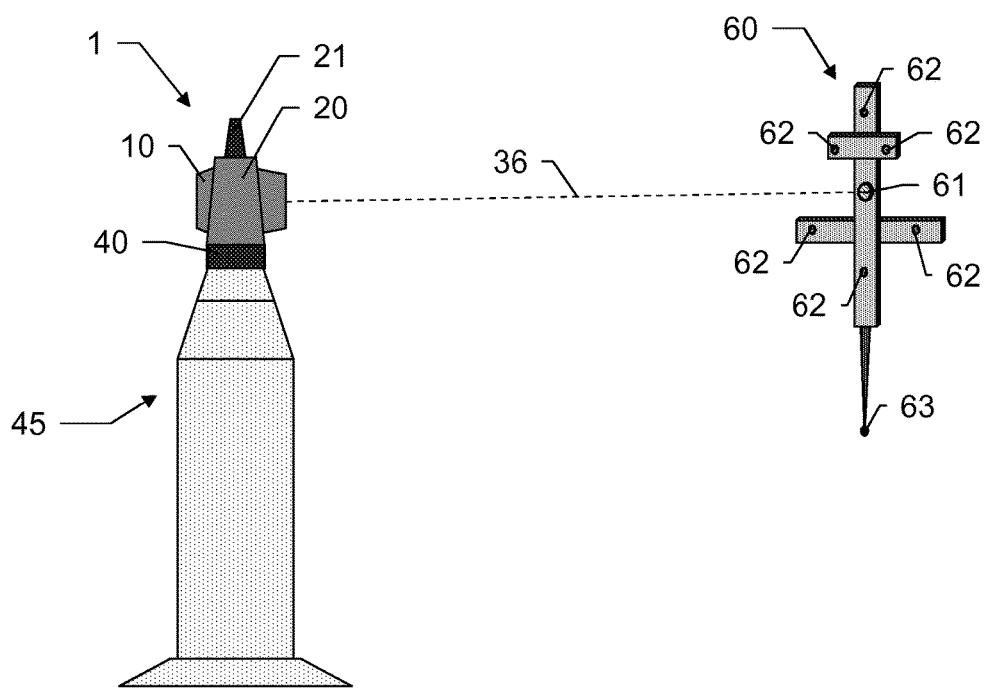
FIG. 1 shows a coordinate measuring device according to the invention, embodied as a laser tracker, and a measuring aid.

FIG. 1 shows an exemplary embodiment of a coordinate measuring device according to the invention, which is embodied as a laser tracker 1. The laser tracker 1 shown comprises a base 40, a support 20 attached thereon having a handle 21, and a beam deflection unit 10, which is mounted on two spars (not shown here) of the support 20. The laser tracker 1 is arranged on a tripod 45 and measures, by means of a laser beam 36, the distance to a retroreflector 61 located on a measuring aid 60. The measuring aid 60—embodied here, for example, as a measuring probe—furthermore comprises a number of target markings 62, for example, in the form of reflective or self-illuminating light spots, and a measurement head 63 for placement on a target point to be surveyed of a target object.

The illustrated laser tracker 1 comprises a measurement camera, which is embodied in particular as a camera system, which can be focused, having variable enlargement (vario camera system), to capture the target markings 62 arranged on the measuring aid 60. The spatial alignment of the measuring aid 60 is determinable on the basis of the positions of the target markings 62 recorded by the measurement camera.

A method, which is usable with such a measurement camera, for the progressive determination of the spatial location of a measuring aid 60, which comprises multiple target markings 62 in a fixed, known spatial relationship in relation to one another, is described in EP 2 557 391 A1: In the scope of this method, a progressive capture of camera images of the target markings 62 using a measurement camera having a surface sensor comprising a plurality of pixels, and a progressive performance of readout passes, during which the pixels are read out with respect to a respective current exposure value, are performed. Furthermore, image positions of the imaged target markings are determined in the respective current camera image and the respective current spatial location of the measuring aid 60 is derived based thereon. In this case, respective current regions of interest on the surface sensor are progressively set in dependence on a collection of image positions determined in at least one previously captured camera image. The determination of the current image positions is then performed exclusively in consideration of only those current exposure values, which are obtained by pixels of the surface sensor located inside the currently set regions of interest.

To be able to recognize and comprehend movements of the measuring aid 60, so that the laser beam 36 remains aligned on the retroreflector 61, the laser tracker 1 comprises a position-sensitive detector (PSD), in particular a tracking surface sensor, as is disclosed, for example, in WO 2007/079600 A1.

The PSD is preferably arranged in the beam deflection unit 10 and enables, by capturing the alignment of the laser beam 30 reflected from a target, in particular the retroreflector 61, the tracking of the alignment of the laser beam 30. By way of the tracking of the laser beam alignment, a progressive target tracking (tracking) of the target point can be performed and the distance and position of the target point can be progressively determined in relation to the measuring device.

Figure 2A:
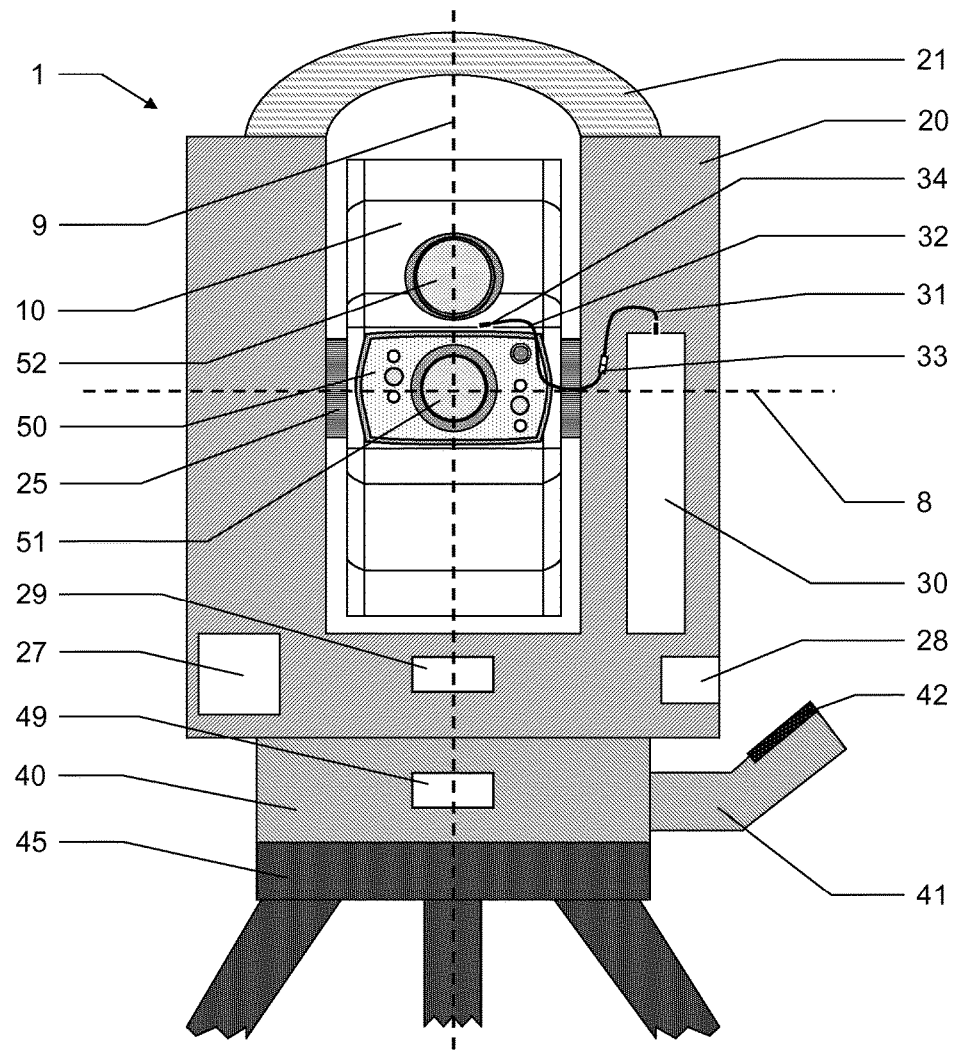
FIGS. 2a-c show a coordinate measuring device according to the invention, embodied as a laser tracker, respectively in a view from the front, from the side, and from above.

FIG. 2a shows an exemplary embodiment of a laser tracker 1 according to the invention in a frontal view. The laser tracker 1 comprises a base 40, which is fastenable on a holding device, illustrated here in the form of a tripod 45. A support 20 is attached to the base 40 so it is mounted to be rotatable about the vertical axis 9. The support 20 comprises a first and a second spar, which protrude upward from a lower part of the support 20 and on which a beam deflection unit 10 is mounted by means of a shaft 25 so it is tiltable about the horizontal axis 8. A handle 21 is attached on top to the two spars for the transport and the handling of the laser tracker 1 by a user.

Both the mounting of the support 20 on the base 40 and also the mounting of the beam deflection unit 10 on the support are preferably embodied as fixed/free bearings. Axial errors as a result of temperature influences and the accuracy losses resulting therefrom are thus minimized. In addition, a temperature-related expansion of the shaft 25 is noncritical and does not influence a tension of the bearing. The tension of the bearing thus remains constant over the entire temperature usage range. Details of such a fixed/free bearing are shown in FIGS. 9a and 9b.

The handle 21 can in particular be fixedly connected to the two spars, for example, produced from a casting with them or welded on, so that it is used as an additional stabilizing element for the spars, in particular with respect to bending. The handle 21 can advantageously be shaped such that it enables a measurement oriented exactly upward, i.e., along the vertical axis 9, by means of the laser beam. Alternatively, the handle 21 can also have an opening for a passage of the laser beam at the corresponding point.

Multiple optics systems are provided on the beam deflection unit 10, among them an optics system 52 of a measurement camera and an objective module 50 for the target tracking functionality having a laser emission and reception optics system 51 of an optical distance measuring device. Furthermore, the beam deflection unit 10 preferably has an optics system of a localization camera for coarse localization of the measuring aid and an optics system of an overview camera for providing images for a user. The optics systems are described in greater detail in FIG. 4.

A laser module 30, preferably a helium-neon laser module (HeNe laser module) is integrated in the support 20 or in one of the spars. Particularly advantageous embodiments of a usable laser module 30 are also disclosed in CH 706 633 A2.

An optical waveguide system, which comprises a first fiber 31 and a second fiber 32, leads from this laser module 30 through the shaft 25 into the beam deflection unit 10 up to a collimator 30 of a distance measuring device (not shown here), in particular an interferometer. In this case, the first fiber 31 of the optical waveguide system, which extends in the support 20, is connected in a torsion-resistant manner via a plug connection 33, which is preferably provided in the support 20, to the second fiber of the optical waveguide system, which extends in the beam deflection unit 10. Arranging the plug connection 33 in the vicinity of the laser module 30 in the support 20 has the advantage that the laser module 30, together with the first fiber 31, is more easily replaceable. The optical waveguide system is preferably polarization-maintaining, and/or the first and the second fibers 31, 32 are single-mode fibers.

The base 40 is fastenable on a tripod 45, in particular by means of a quick-release fastener (see FIG. 11). Since the base 40 represents the stationary, non-rotating part of the laser tracker 1, possibly provided cable connections of the laser tracker (in particular for the power supply, for communication with external sensor or monitoring units, or for connection to networks) are preferably connected to the base 40. These connections can alternatively also be provided via the connection to the tripod 45, however. The base 40 preferably has a self-leveling unit 42 for the self-leveling or the initialization of the laser tracker 1.

This self-leveling unit 42 can, for example, as shown in FIG. 2a, be attached to a boom arm 41 of the base 40 and can contain one or more mirrors, reflectors, and/or sensors. Particularly advantageous embodiments (not shown here) of a self-leveling unit 42 are described in detail in particular in European patent applications EP 2 687 866 A1, EP 2 746 806 A1, and EP 2 746 807 A1. Thus, the self-leveling unit can be embodied, for example, as a combination of a PSD with a retroreflector or can also be provided entirely or partially in the interior of the beam deflection unit 10, in particular as a retroreflective film movable into the beam path of the measurement radiation. The self-leveling unit 42 on the base 40 can also comprise a retroreflector and an optics assembly acting as a reducing objective, and, to determine the calibration parameters for the laser tracker 1, can be able to be targeted using the measurement radiation such that an optical beam path of the measurement radiation extends through the optics assembly and the measurement radiation is incident on the retroreflector, whereby a calibration measurement can be carried out having a simulated distance to the retroreflector, which is greater than an actual distance to the retroreflector.

The laser tracker 1 additionally comprises an analysis and control unit 27. It is provided here in the support 20 as an example.

A first inclination sensor 49 is provided on the base 40 and a second inclination sensor 29 is provided on the support 20, which are embodied and arranged to capture an inclination in at least two essentially orthogonal directions in relation to the direction of gravity.

In addition, a meteorology station 28 is provided on the support 20. It comprises sensors for capturing diverse environmental factors. In particular, the sensors comprise temperature, air pressure, and humidity sensors. Alternatively, the meteorology station 28 can also be housed outside the laser tracker 1, for example, in a separate monitoring unit.

The inclination and environmental data generated by the inclination sensors 29, 49 and the meteorology station 28 are provided to the analysis and control unit 27 of the laser tracker 1.

Figure 2B:
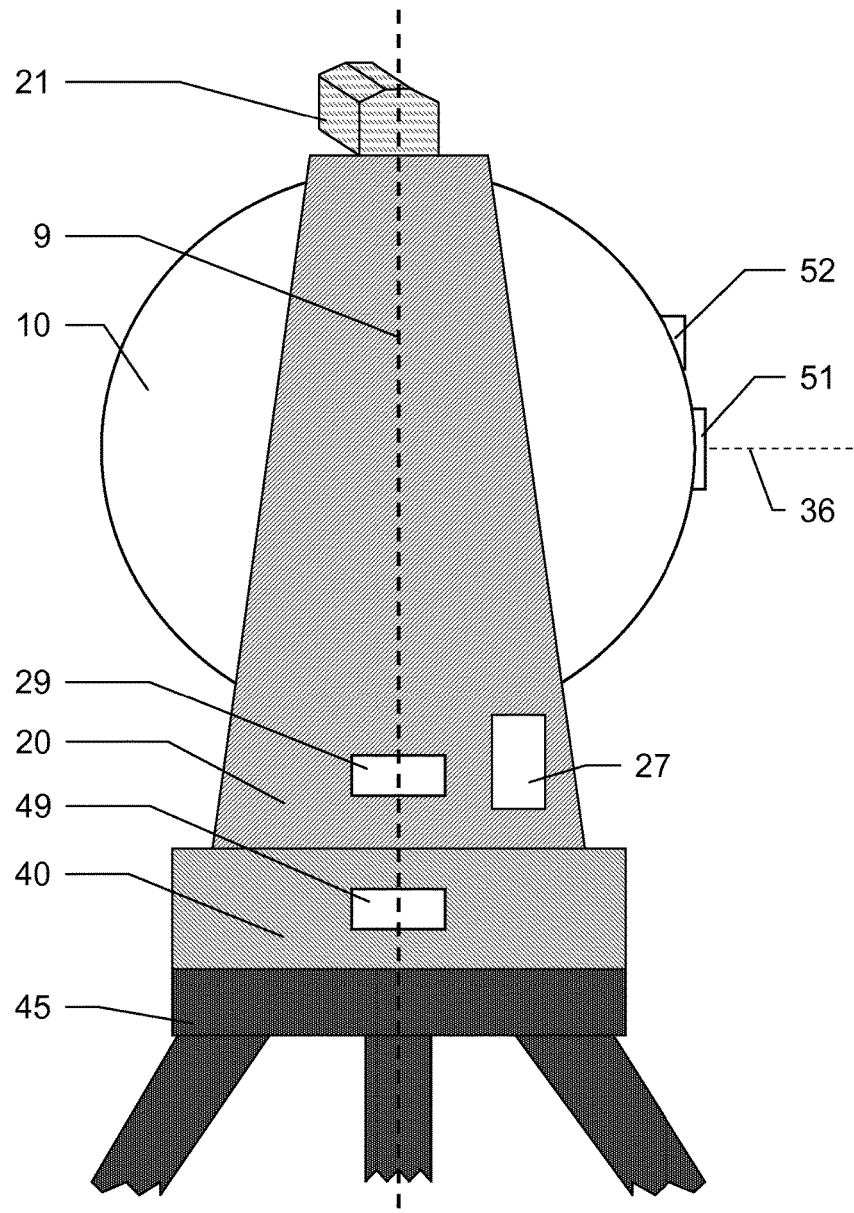

FIG. 2b shows the laser tracker 1 from FIG. 2a in a side view. The structure of the laser tracker 1 can also be inferred from this view, having the base 40 arranged on a tripod 45, the support 20, which is fastened thereon so it is rotatable about the vertical axis 9, and the beam deflection unit 10, which is mounted thereon so it is rotatable about the horizontal axis. In addition, the laser beam 36 emitted from the laser emission and reception optics system 51 of the optical distance measuring device is shown.

The shape of the handle 21, which is laterally bent in its middle, is also recognizable in this view, by which a measurement oriented exactly upward by means of the laser beam 36, i.e., a measurement along the vertical axis 9, is enabled.

Figure 2C:
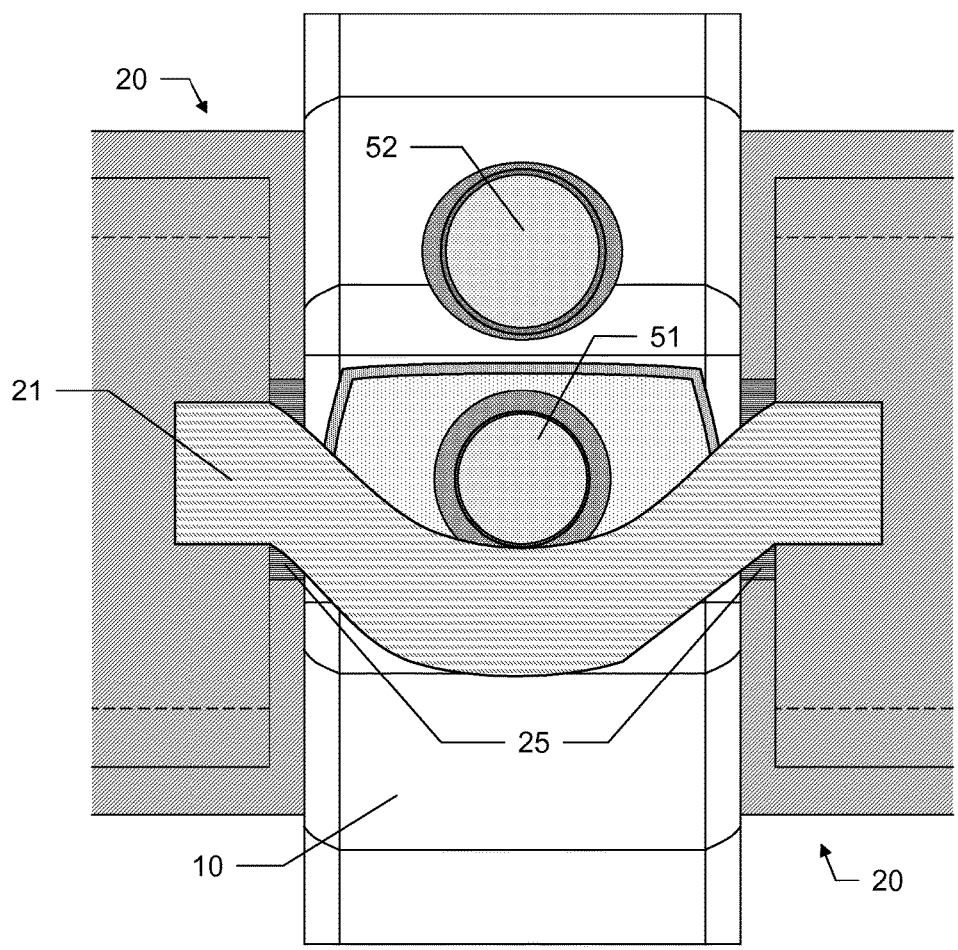

This is also shown in FIG. 2c, which shows the laser tracker from above. The beam deflection unit 10, which is mounted on the support 20, is rotated exactly upward in this view, so that a measurement can be performed along the vertical axis 9. The handle 21 is embodied such that in this alignment of the beam deflection unit 10, neither the optics system 52 of the measurement camera nor the laser emission and reception optics system 51 are concealed by the handle 21.

Figure 3:
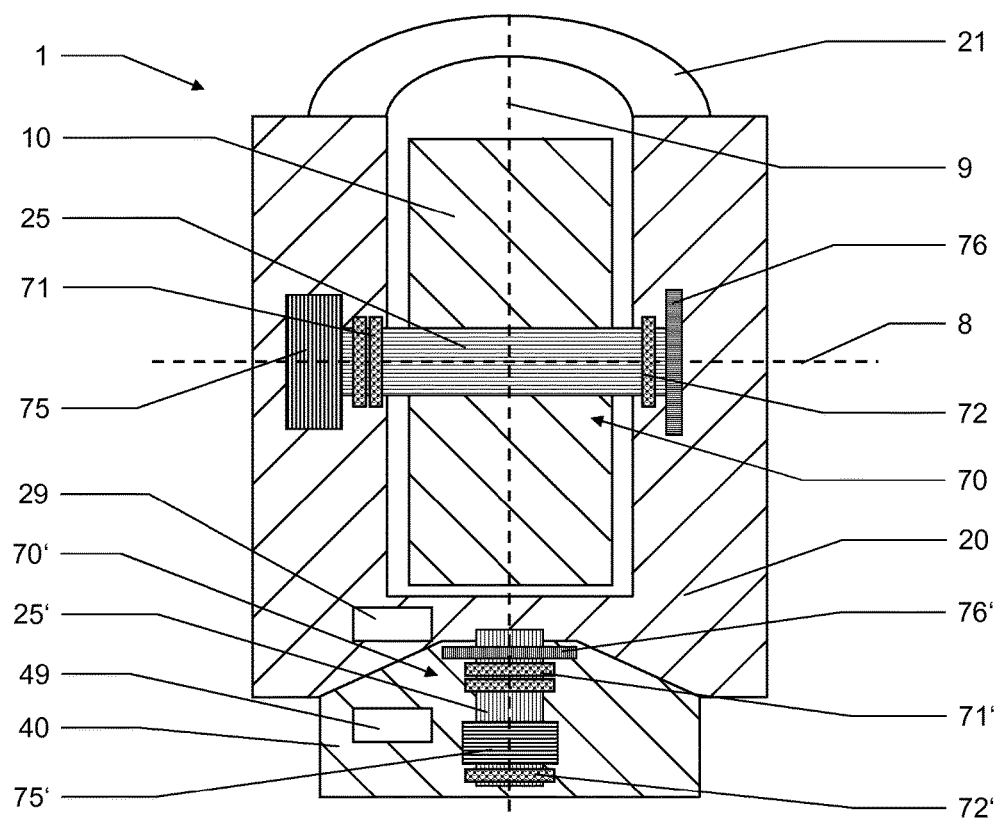
FIG. 3 shows an exemplary embodiment of a coordinate measuring device according to the invention, embodied as a laser tracker, in a cross section.

FIG. 3 shows an embodiment of the laser tracker 1 in a cross section, wherein the bearings 70, 70' of the device are shown. These bearings are embodied in this example as fixed/free bearings, but can also be embodied differently, of course. A first horizontal bearing 70 mounts the beam deflection unit 10 on the support 20, a second vertical bearing 70 mounts the support 20 on the base 40. An exemplary embodiment of the first bearing 70 is shown in greater detail in FIGS. 9a and 9b.

The first fixed/free bearing device 70 enables a rotatability of the telescope unit 10 about the tilt axis 8 and contains a shaft 25, which is mounted in the two lateral spars of the support 20, wherein a fixed bearing 71 is provided in one spar and a free bearing 72 is provided in the other spar. A motor 75 is provided to drive the shaft 25 rotationally. On the other side, a first angle encoder 76 is provided to capture relative and/or absolute positions of the shaft 25, in order to determine a current alignment of the telescope unit 10 in relation to the support 20. The shaft 25 is preferably manufactured from steel, brass, or ceramic and is essentially cylindrical.

The second fixed/free bearing device 70' enables a rotatability of the support 20 about the standing axis 9 and contains a shaft 25', which is mounted in the base 40 and fastened on the support, wherein a fixed bearing 71' is provided in the upper part of the base 40, facing toward the support 20, and a free bearing 72' is provided in the lower part. A motor 75' is provided on the free bearing 72' to drive the shaft 25' rotationally. A second angle encoder 76' is provided on the fixed bearing 71' to capture relative and/or absolute positions of the shaft 25', in order to determine a current alignment of the support 20 in relation to the base 40.

Figure 4:
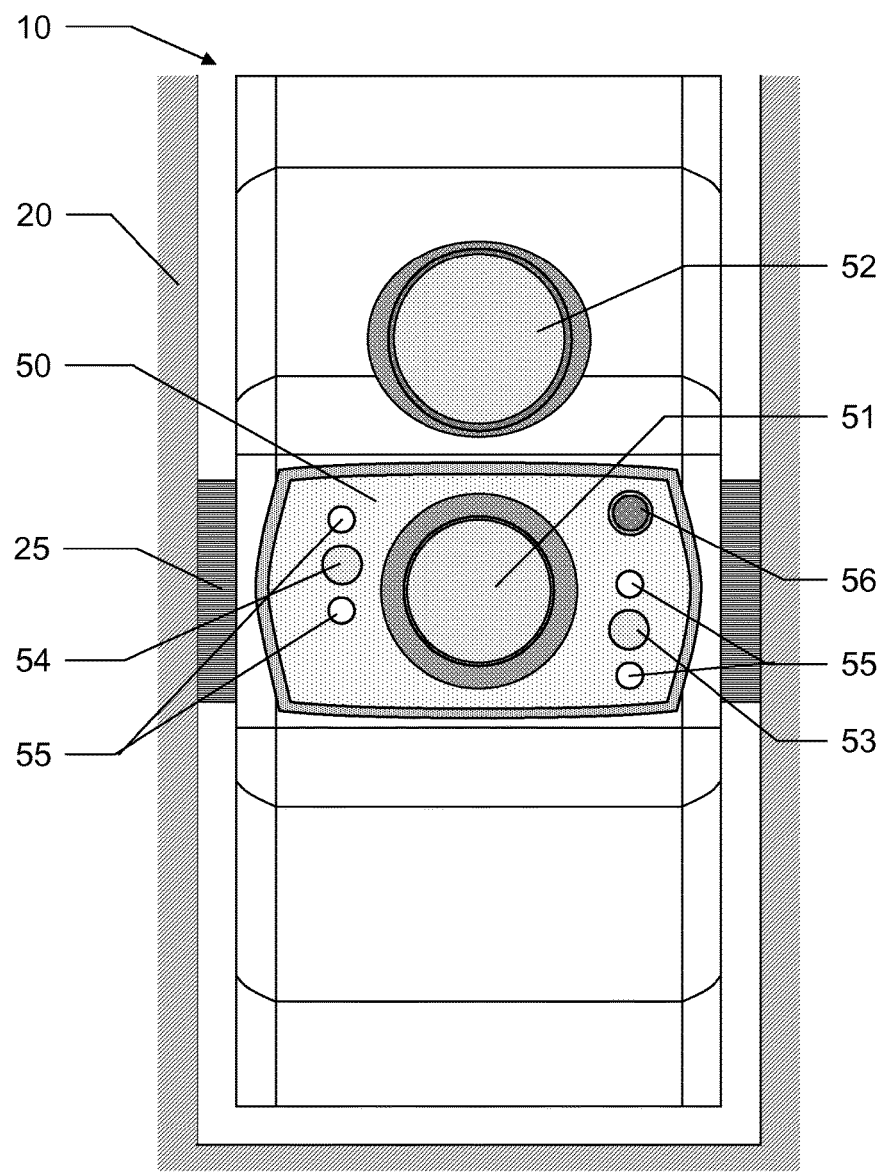
FIG. 4 shows an exemplary embodiment of a beam deflection unit of a coordinate measuring device according to the invention in a front view.

In FIG. 4, the beam deflection unit 10, which is mounted by means of the shaft 25 on the support 20, is shown in a frontal view. The objective module 50 contains, in addition to the objective 51 of the distance measuring device, two localization cameras 53, 54 having illumination means 55, and an overview camera 56. The objective 52 of the measurement camera is attached above the objective module 50.

Each of the two localization cameras 53, 54 comprises illumination means 55, for example, LEDs, for the active coaxial target illumination, in particular in the infrared range, and is capable of detecting the light, which is emitted by the illumination means 55 and reflected by a retroreflector of a measuring aid. In addition, means for image processing are provided, which enable a recognition of the measuring aid, or the retroreflectors attached to the measuring aid. Solutions having only one localization camera 53 are also possible. For example, various embodiments are described in the European patent application having application Ser. No. 13/176,647.9, in which only a single localization camera is required for the localization of the target.

In the embodiment shown here, the localization cameras 53, identify reflective objects by means of the active illumination, such as retroreflectors on the measuring aid. The objects identified individually by the two cameras are brought together, the distance to each of the identified objects is then measured by means of triangulation to enable an alignment of the laser tracker on a target, without further measurements being necessary.

Figure 5:
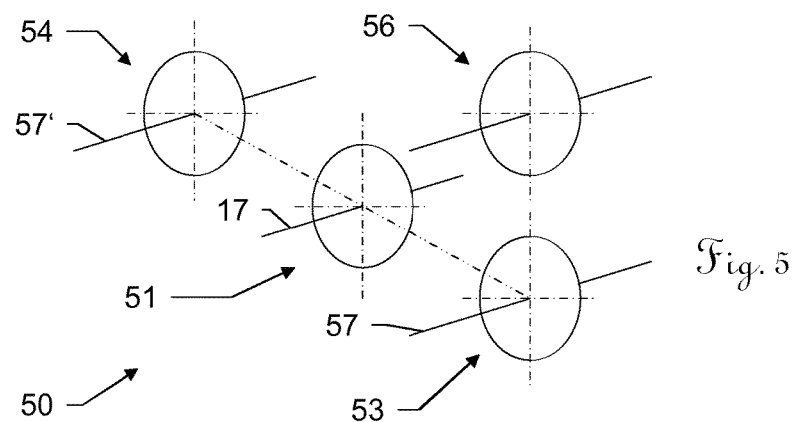
FIG. 5 shows an exemplary arrangement of the positioning camera.

In the case of at least two localization cameras 53, 54, as shown in FIG. 5, they are preferably situated symmetrically around the objective of the distance measuring device 51. The viewing axes 57, 57' of the localization cameras 53, 54 can be arranged in parallel to the axis 17 of the distance measuring device. Further advantageous arrangements of the localization cameras 53, 54 are described in patent document EP 2 602 641 B1. In particular, the localization cameras 53, 54 are arranged, as shown in FIG. 5, so that, viewed from the first localization camera 53, in each case at least one localization camera is located on the opposing side of the first axis of rotation and at least one localization camera is located on the opposing side of the second axis of rotation. In this case, the second localization camera 54 is located on the opposing side of both the first and also the second axes of rotation.

Figure 6:
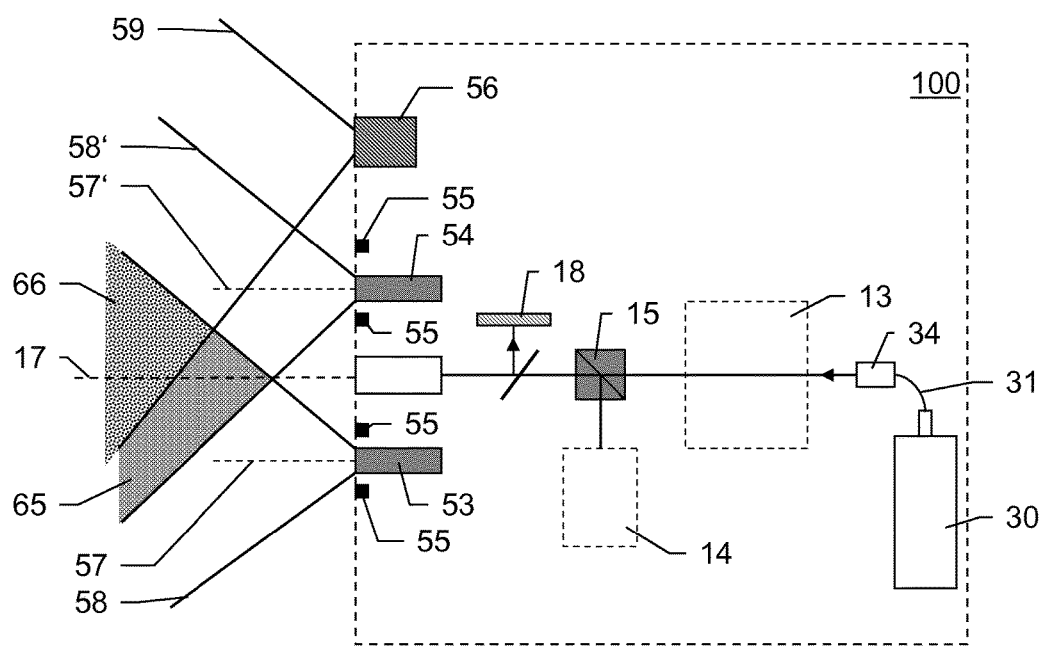
FIG. 6 shows an exemplary structure of an optical unit of a coordinate measuring device according to the invention.

FIG. 6 shows an embodiment of an optical structure of a laser tracker according to the invention. An optical unit 100 of the laser tracker comprises in this case a laser beam source 30—for example, a HeNe laser source or a laser diode—and a collimator 34 for coupling the laser radiation generated using the beam source 30 into the measurement beam path. The radiation is guided in the structure shown by means of an optical fiber 31 from the laser beam source 30 to the collimator 34, but can alternatively also be coupled directly or by optical deflection means into the measurement beam path. The optical unit 100 additionally has an interferometer unit 13, by means of which distance changes to the target can be detected and measured. The radiation generated using the beam source 30 is used as measurement radiation for the interferometer 13, split in the interferometer 13 into a reference path and a measurement path, and detected together with the reference beam on a detector after reflection of the measurement beam on the target. In addition, an absolute distance measuring unit (ADM unit) 14 having a further beam source, for example, a laser diode or a SLED (super luminescent LED), and a further detector is provided. The ADM unit 14 is used for determining the distance to the target, wherein the radiation generated thereby is guided by means of a beam splitter 15 together with the interferometer radiation onto a shared measurement radiation path.

The light beam originating from the beam source of the ADM unit 14 is guided inside the unit onto a polarizing beam splitter and from there through an electro-optical modulator to a wavelength-dependent beam splitter 15. Such a beam splitter 15 having wavelength-dependent beam splitting is used in particular in the case of different emission wavelengths of the two light sources. The returning light is guided in the ADM unit 14 through the polarizing beam splitter 15 onto a detector of the ADM unit 14. Other ADM arrangements and methods are also usable in this context in particular, in which the measurement light beam may be coupled in and out by, for example, the wavelength-dependent beam splitter 15. An example of such a distance meter is disclosed in WO 03/062744 A1. Fundamentally, other types of absolute distance meters, for example, phase meters, are also usable here as in the other embodiments of the invention.

The arrangement of the optical components and the guiding of the measurement radiation in the optical unit 100 define a measurement direction or an optical measurement axis 17. For a precise determination of a distance to the target, measured values of both ADM unit 14 and interferometer 13 can be considered and in particular linked. In a special embodiment of a laser tracker, ADM unit 14 and interferometer 13 can define different measurement beam paths and/or can be arranged structurally separated, in particular in different measurement groups.

In addition, a position-sensitive detector (PSD) 18 is arranged in the optical unit 100 such that measurement laser radiation reflected on the target can be detected thereon. By means of this PSD 18, a deviation of the captured beam from a detector zero point can be determined and tracking of the laser beam on the target can be performed on the basis of the deviation. For this purpose and to achieve a high precision, the field of vision of this PSD 18 is selected to be as small as possible, i.e., corresponding to the beam diameter of the measurement laser beam. A capture using the PSD 18 is performed coaxially to the measurement axis 17, so that the capture direction of the PSD 18 corresponds to the measurement direction. The application of the PSD-based tracking and the fine targeting can first be performed after the measurement laser has been aligned on the retroreflective target on the basis of the image capture of the two cameras 53, 54 and a photogrammetric analysis of the images.

The optical unit 100 furthermore has two target search cameras 53, 54 having a respective optical axis or detection direction 57, 57' and illumination means 55. Furthermore, each of the target search cameras 53, 54 defines a target search field of vision 58, 58', wherein the cameras 53, 54 are arranged such that the fields of vision 58, 58' overlap and therefore an overlap region 65 is established.

Electromagnetic radiation for illuminating the target can be emitted by means of the illumination means 55. If this radiation is reflected on the target and at least partially reflected in the direction of the two target search cameras 53, 54, the reflected illumination radiation can be captured using both cameras 53, 54 in one image in each case as the target position. By way of an arrangement of the target search cameras 53, 54 such that an overlapping visible region 65 is provided, the target can be captured in this region 65 using both cameras 53, 54, and a coarse distance to the target and/or a coarse position of the target can be determined.

In addition to the arrangements of the target search cameras 53, 54, which are shown as examples, diverse further arrangements, which cannot be illustrated here in their variety, are possible. In a special embodiment, the target search cameras 53, 54 can also be arranged, for example, such that the optical axes 57, 57' thereof are each arranged offset in parallel or at a defined angle in relation to the measurement axis 17. In a further special embodiment, an angled arrangement of the optical axes 57, 57' in relation to the measurement axis 17 is implementable in such a manner that the optical axes 57, 57' are each aligned "glancing" in relation to one another or aligned "glancing toward" the measurement axis 17 or "glancing away" therefrom, and therefore do not extend in parallel to the measurement axis 17. Such an arrangement can be provided, for example, for generating a relatively large overlap region 65 of the fields of vision 58, 58'. In a further special embodiment, the target search cameras 53, 54 and the measurement axis 17 can be arranged such that at least one of the optical axes 57, 57' of the target search cameras 33, 34 is arranged coaxially, i.e., not offset, in relation to the measurement axis 17.

Furthermore, an overview camera 56 having an overview field of vision 59 is provided on the optical unit 100, as also described in European patent application EP 2 618 175 A1. In this case, the overview camera 56 is arranged so that the overview field of vision 59 overlaps with each of the target search fields of vision 58, 58' and thus a shared overlap region 66 is defined. By way of the arrangement shown of the cameras 53, 54, 56 and the fields of vision 58, 58', 59 thereof, referencing of search image positions which can be captured using the target search cameras 33, can be performed in an overview image which can be captured using the overview camera 36.

Figure 7:
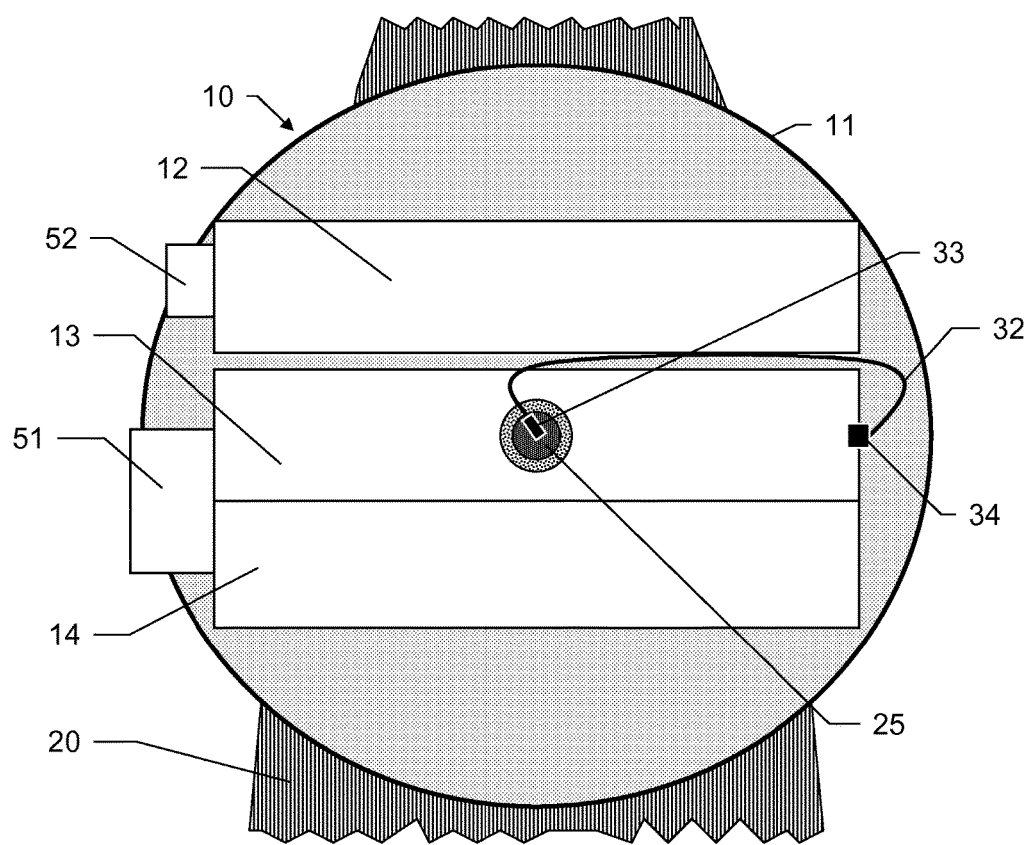
FIG. 7 shows an exemplary structure of a beam deflection unit of a coordinate measuring device according to the invention in a cross section.

FIG. 7 shows an exemplary structure of a beam deflection unit 10 in cross section. The beam deflection unit 10 comprises a housing 11—preferably consisting of aluminum or another light material having good thermal conductivity. For an improved dissipation of heat arising inside the beam deflection unit 10, energy-intensive components of the beam deflection unit 10 can be coupled directly to this housing, which advantageously counteracts overheating of the components. Alternatively or additionally, heat pipes or other heat conductors can conduct the heat of these components to the housing or to the outside. Furthermore, the components are preferably arranged distributed in the beam deflection unit 10 according to the heat generation thereof such that the heat generation is distributed as uniformly as possible over the volume of the beam deflection unit and can be optimally dissipated to the environment via the housing 11. Heat-sensitive components can additionally also be installed in a thermally insulated manner, to shield them from the heat of other components.

The beam deflection unit 10 is mounted by means of the centrally arranged shaft 25 on the support 20, preferably by means of a fixed/free bearing (shown in FIGS. 9a and 9b). A polarization-maintaining optical waveguide system leads through the preferably hollow shaft 25. An optical waveguide fiber 32, which extends in the interior of the beam deflection unit 10, connects, jointly with a fiber (not shown here) extending in the support 20, to which it is connected in a torsion-resistant manner via a plug connection 33, a laser source located in the support 20, in particular a HeNe laser module (not shown here), to a collimator 34 of an interferometer 13.

The interferometer 13 forms, together with an absolute distance meter 14, a distance measuring device for measuring the distance to a target, in particular a measuring aid having a retroreflector. The distance measuring device comprises a shared optics system 51 for interferometer 13 and absolute distance meter 14.

The interferometer 13 is preferably equipped with a checking functionality for checking the measurement with regard to possibly occurring measurement errors. Such a functionality is described in European patent application EP 2 634 594 A1: In the scope of this checking functionality, firstly a chronologically resolved interference curve, which is provided due to the progressive detection of the intensity state, is analyzed such that a movement parameter for a recognized relative movement between target and interferometer 13 is progressively derived. This parameter represents a relative movement variable, for example, relative velocity or relative acceleration, of the target or the interferometer 13. The progressively derived movement parameter is then progressively compared to a respective criterion for the respective determined movement variable. By means of the criterion, the movement variable is defined in this case such that a differentiation can be carried out between possibly executable and impossibly executable movements of the target and/or the interferometer 13 on the basis of this variable.

The beam deflection unit 10 additionally comprises a measurement camera 12 for determining the orientation of a measuring aid having a separate optics system 52. The camera can preferably have a zoom function, wherein an enlargement step can be set in dependence on the determined distance between laser tracker and target point or measuring aid (vario camera). Using these two adaptation functions (alignment and enlargement), the camera can therefore progressively capture an image in which the measuring aid and in particular the light spots of the measuring aid (see FIG. 1) are imaged. An electronically analyzable two-dimensional image of a spatial arrangement of light spots thus results.

Figure 8:
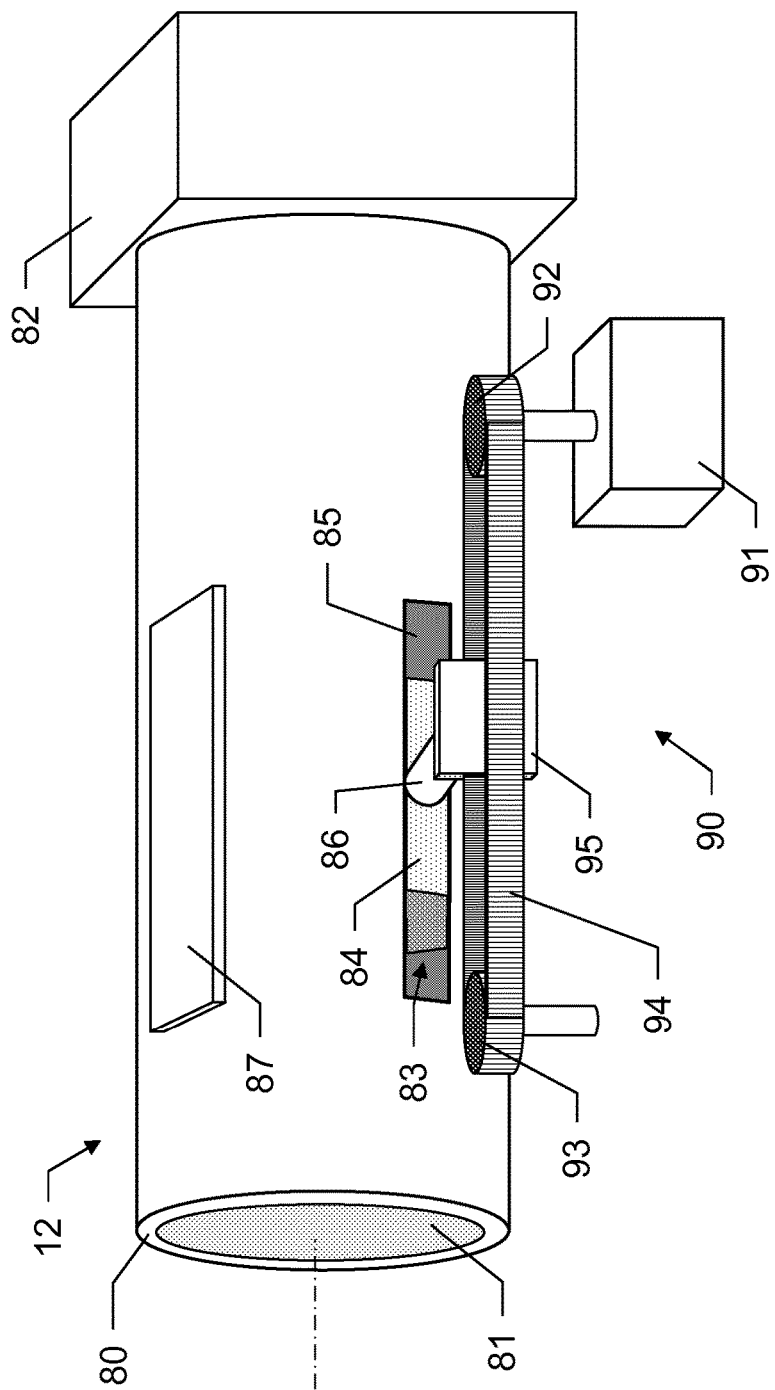
FIG. 8 shows an exemplary embodiment of a vario camera as a measurement camera.

FIG. 8 shows an embodiment of a measurement camera 12 embodied as a vario camera in detail. Particularly advantageous embodiments of such a vario camera are also described in European patent application EP 2 639 615 A1.

The vario camera 12 shown in FIG. 8 contains an objective tube, which comprises a tube body 80 and which is delimited at one end using an optical element 81 in the form of a lens and at the other end by a sensor element 82. On the exterior, the tube body 80—as shown here as an example—can assume the shape of a cylinder, but can also be shaped as a cuboid block or in another manner. The interior of the objective tube (tube interior)—not shown here—defined by the tube body 80 advantageously has an essentially cylindrical shape, however.

At least one carriage 83 is attached so it is linearly movable in the tube interior. The carriage 83 comprises an optics assembly and an optics carrier 84 and is movable by means of a drive unit 90 along the longitudinal axis of the objective tube.

The drive unit 90 comprises a motor 91, in particular in the form of a direct-current geared motor, a deflection roller 92, which can be pre-tensioned, a further deflection roller 93, and a toothed belt 94 stretched over the deflection rollers 92, 93. A movement-transmitting element 95 is fastened on the toothed belt 94, for example, clamped on, this element transmitting the movement to the carriage 83 via a driver 86. To guide the driver 86, the tube body 80 comprises an oblong slot 85. For better sliding in this longitudinal guide slot 85, the driver 86 can have sliding elements (not shown).

A scanning module 87 having a scanning sensor for capturing a position code and deriving a position of the carriage 83 is arranged on the tube body 80. The position code is part of a position encoder element (not shown), which is arranged in an invariable spatial relationship to the optics assembly of the carriage 83, in particular in that all components of the carriage 83, or at least the optics assembly and the component carrying the position encoder element, are connected to one another without play. It is thus possible to derive a change of the position of the optics assembly directly from the signal generated by the scanning sensor. If the spatial relationship is additionally known, an unambiguous present position of the optics assembly can also be derived.

FIGS. 9a and 9b show an exemplary embodiment of a fixed/free bearing for mounting the beam deflection unit (not shown here) of the laser tracker on the support 20. Such a fixed/free bearing is described in European patent application EP 2 607 843 A1. The mounting of the support 20 on the base 40 is preferably also executed by means of a fixed/free bearing.

In each of FIGS. 9a and 9b, a part of the shaft 25 of the fixed/free bearing device with its respective mounting in the two spars of the support 20 is shown in cross section. FIG. 9a shows the mounting on the first spar using the fixed bearing 71, FIG. 9b shows the mounting on the second spar using the free bearing 72. The shaft 25 is hollow and has a cylindrical shape at the mountings.

The fixed bearing 71 shown in FIG. 9a comprises two roller bearings arranged in pairs, in particular a duplex spindle bearing pair or a UKF® spindle bearing having separating balls. An X arrangement of the roller bearings arranged in pairs is shown as an example.

The free bearing 72 shown in FIG. 9b has a ball bearing having a ball cage, which is intended to absorb radial forces. The free bearing 72 is fixed on the shaft 25 and is arranged so it is movable in the spar of the support in the axial direction, for example, to be able to move with the shaft 25 without tension in the event of temperature-related expansion variations of the shaft. The roller bodies of the free bearing 72 have a specific excess in relation to the inner and outer runways. Both runways have a good hardness quality.

The two bearings 71, 72 are preferably not directly installed in adjoining light components of the spars, which consist of aluminum in particular, but rather in attachment parts 77, 78 made of steel. The selected fitting between bearing and flange is thus maintained over the entire temperature usage range. The steel attachment parts 77, 78 are fixedly connected to components 22 of the spars. Axial errors as a result of temperature influences and accuracy losses resulting therefrom are thus minimized.

FIG. 9b additionally shows an optical waveguide system, which is guided through the hollow shaft 25 and is preferably polarization-maintaining. This system comprises a first fiber 31, which leads to a laser module in the support 20, a second fiber 32, which leads into the beam deflection unit, and a plug connection 33 for the torsion-resistant connection of the two fibers 31, 32.

FIG. 10 schematically shows an exemplary interaction of sensor units 28, 29, 49 and optical unit 100 with the analysis and control unit 27. In this illustration, two inclination sensors 29, 49 function as sensor units, which are embodied and arranged to capture an inclination in at least two essentially orthogonal directions in relation to the direction of gravity, and a meteorology station 28 for measuring the ambient air by means of temperature, air pressure, and humidity sensors. In this case, the first inclination sensor is arranged in the base 40, the analysis and control unit 27, the meteorology station 28, and the second inclination sensor 29 are arranged in the support 20, and the optical unit 100 is arranged in the beam deflection unit 10. The individual sensor units 28, 29, 49 transmit captured inclination and environmental data to the analysis and control unit 27, which analyzes the data. The analysis and control unit 27 additionally exchanges data with the optical unit 100.

The analysis of the inclination data and environmental data can be used in particular to generate calibration data. Thus, for example, the environmental temperature permits a current expansion of the axes of the device to be concluded, and a deviation between the inclination values of the two inclination sensors permits a non-exact alignment of the support 20 along the standing axis to be concluded. Both of these can have an influence on measurements of the optical unit 100, and are relevant in particular for high-precision applications.

On the one hand, the data can be captured and analyzed progressively, i.e., also during the measurement operation of the coordinate measuring device, to keep the measurement exact progressively, or, on the other hand, the data can be used in the scope of a self-calibration functionality, in particular together with other calibration data, by a calibration device for periodic calibration of the device.

The data of the two inclination sensors 29, 49 can be captured simultaneously by the analysis and control unit 27 in this case, which enables a direct comparison between the two values. In the case of a substantial deviation of the two values from one another, in particular a notification can be provided to a user of required maintenance, for example, an adjustment or a replacement of the mounting of the support on the base.

It is also advantageously possible to firstly capture data of the first inclination sensor 29 and to reconcile these data with data of the second inclination sensor 49, which are captured during a measurement sequence. This is significant in particular if the first inclination sensor 29 located in the support 20 is of a nature that deviations can occur during a measurement sequence as a result of forces occurring from rotations during the readout of the present inclination. For example, the strong rotational movements occurring in a laser tracker can, in an inclination sensor 29 embodied as an "oil can" with liquid horizontal, offset the surface of the liquid used for the inclination determination into oscillations. This can result in the formation of waves or foam, which results in a different reflection result when a light beam is deflected on the liquid horizontal, and therefore in incorrect values.

In such a case, the measurement sequence can be preceded by an initialization sequence, in the scope of which inclination data of the first inclination sensor 29 are captured in multiple, for example, four different positions of the support 20 in relation to the base 40—preferably together with the inclination data of the second inclination sensor 49. During the measurement sequence itself, only inclination data of the second inclination sensor 49 are then captured, which remain uninfluenced by the rotational movements of the support 20, in contrast to the first inclination sensor 29. An unintended change of the inclination of the coordinate measuring device, for example, tilting or sinking, can thus also be recognized during the measurement sequence.

As a consequence of the recognized inclination change during the measurement, for example, an acoustic or visual warning can then be output to the user or the measurement sequence can be automatically stopped and a new initialization can be carried out. The progressively ascertained inclination data of the second inclination sensor 49 can advantageously also be used for the real-time correction of the coordinates ascertained during the measurement sequence by the coordinate measuring device, however.

An exemplary embodiment of a quick-release fastener unit for fastening the base 40 on the tripod 45 is shown in FIGS. 11 and 12, wherein the quick-release fastener unit provides vertical damping according to the invention. During the placement of the base 40 on the tripod 45 by a user, in particular as a result of the high weight of the coordinate measuring device, shocks of the sensitive components of the device can occur. In this case, depending on the severity and frequency of the shocks, slight shifts—which are still disadvantageous for carrying out high-precision measurements—of individual elements or even damage can occur. A damping concept can therefore contribute to also ensuring the precision of the device in the long term.

FIG. 11 shows the uppermost part of the tripod 45, which is embodied as a quick-release fastener unit to accommodate the base of the coordinate measuring device. This unit has a flat contact surface 46, from which a socket having a bulge 44 protrudes at its upper end. Locking pins 48 are located laterally countersunk in the socket, which are embodied as extendable by means of a quick-release fastener mechanism, in particular a locking lever (not shown here) of the tripod 45.

Three shock absorber piston rods 47 protrude out of the contact surface 46, which each form a movable element, provided for momentum absorption, of a compact shock absorber countersunk in the quick-release fastener unit.

FIG. 12 shows the lower side of the base 40, which can be placed on the quick-release fastener unit of the tripod 45 shown in FIG. 11. The base 40 has components corresponding with one component of the quick-release fastener unit in each case for this purpose. The flat contact surface 46' has the same dimensions as the contact surface 46 of the quick-release fastener unit and rests thereon after the placement. The bulge 44' at the end of a cavity in the middle of the flat surface 46' accommodates the bulge 44 on the socket of the tripod 45 during the placement. The locking pins 48 of the tripod, in the extended state, ensure clamping of the cavity interior 48' of the base or act as a bolt when they engage in optional openings (not shown here) in the cavity interior 48'. In the latter case, markings on tripod and base can indicate the correct alignment of the base on the tripod to the user. In addition to the contact surface 46, five rubber cushions 43 are attached to the lower side of the base 40.

The shock absorber piston rods 47 shown in FIG. 11 damp the forces acting during the placement and thus protect the components of the device from excessively strong shocks. Due to their connection to a shock absorber, the shock absorber piston rods 47 are slowly pressed just far enough into the shock absorber in the tripod during the placement of the coordinate measuring device, under the weight thereof, so that they are planar with the contact surface of the quick-release fastener unit, whereby the two contact surfaces 46, 46' can contact one another over the entire surface.

The shock absorbers can be able to be screwed in, in particular, for example, of the type Enidine TK 21M or of the type Enidine TK 6M. The shock absorbers are preferably adapted in the number and distribution thereof to the weight of the corresponding coordinate measuring device; for example, three or four shock absorbers can be distributed uniformly over the contact surface. Of course, instead of in the quick-release fastener unit, the shock absorbers can also be housed in the base 40, or some in the quick-release fastener unit and some on the base 40.

The rubber cushions 43, which are attached on the lower side of the base 40 outside the contact surface 46, protect to a certain extent from shocks due to the buffering action thereof, if the coordinate measuring device is not fastened on the tripod 45, but rather is placed on another hard surface such as a table or the ground. The five rubber cushions 43 shown here are produced, for example, from a synthetic rubber, such as ethylene-propylene-diene rubber (EPDM) and preferably protrude at least 1 mm beyond the lower side of the base 40.

It is obvious that these illustrated figures only schematically illustrate possible exemplary embodiments. The various approaches can also be combined with one another and with methods and devices of the prior art.

What is claimed is:

1. A coordinate measuring device for capturing the position and alignment of a measuring aid, which is movable in space and comprises a retroreflector, wherein the coordinate measuring device at least comprises:
   a support fastened on a base so it is rotatable about a first axis of rotation, a beam deflection unit fastened on the support so it is rotatable about a second axis of rotation, which is essentially orthogonal to the first axis of rotation, a first bearing for the rotatable mounting of the beam deflection unit on the support, and a second bearing for the rotatable mounting of the support on the base, wherein:

the beam deflection unit comprises an optical distance measuring device having at least one distance meter for measuring the distance to the measuring aid by means of measurement radiation, the first bearing comprises a first angle encoder and the second bearing comprises a second angle encoder, and a first inclination sensor is provided on the base, wherein:

a second inclination sensor on the support, wherein the first inclination sensor and the second inclination sensor are each embodied to capture an inclination in at least two essentially orthogonal directions in relation to the direction of gravity and to output inclination data, and an analysis and control unit, which is embodied, for the purpose of self-monitoring and/or self-calibration of the coordinate measuring device, to capture and analyze the inclination data of the two inclination sensors.

2. The coordinate measuring device according to claim 1, wherein:

a tracking functionality for the progressive tracking of the measuring aid, wherein a first position-sensitive surface detector is provided in the beam deflection unit.

3. The coordinate measuring device according to claim 1, wherein:

the beam deflection unit comprises a measurement camera for capturing the spatial alignment of the measuring aid.

4. The coordinate measuring device according to claim 1, wherein:

the beam deflection unit comprises at least one first localization camera for coarse localization of the measuring aid.

5. The coordinate measuring device according to claim 1, wherein:

a handle as a connecting element of a first and a second spar of the support, wherein the handle does not touch the first axis of rotation, wherein the handle is bent or has an opening, so that a measurement of the distance to a target along the first axis of rotation is enabled.

6. The coordinate measuring device according to claim 1, wherein:

the first and the second inclination sensors are precision inclination sensors having:

a usage range of ±1.5 mrad to ±3.0 mrad, a precision of +/−0.004 mrad to +/−0.04 mrad, and a resolution of 0.0005 mrad to 0.0015 mrad.

7. The coordinate measuring device according to claim 1, wherein:

the analysis and control unit is embodied to capture inclination data of the two inclination sensors simultaneously and correlate them with one another.

8. The coordinate measuring device according to claim 1, wherein:

the analysis and control unit is embodied to capture the data independently of one another and correlate them with one another.

9. The coordinate measuring device according to claim 1, wherein:

the coordinate measuring device is embodied to execute a measurement sequence, in the scope of which the support is rotated in relation to the base by means of a first motor about the first axis of rotation, wherein the analysis and control unit is embodied, before the measurement sequence, to capture inclination data of the two inclination sensors and to correlate them with one another as initialization inclination data; and during the measurement sequence, to capture inclination data of the second inclination sensor and correlate them with the initialization inclination data for the purpose of self-monitoring and/or self-calibration of the coordinate measuring device during the measurement sequence.

10. The coordinate measuring device according to claim 1, wherein:

a meteorology station having sensors for ascertaining a temperature, a pressure, and/or a humidity of ambient air, wherein:

the meteorology station is embodied to output the ascertained data as environmental data, and the analysis and control unit is also embodied to capture and analyze the environmental data.

11. The coordinate measuring device according to claim 1, wherein:

a calibration device for use with a self-calibration functionality, in the scope of which calibration parameters are determinable with respect to a position and/or direction of the measurement radiation, wherein analyzed inclination data are also used for the self-calibration functionality, wherein:

the calibration device comprises a second position-sensitive surface detector on the base, onto which measurement radiation can be emitted from the beam deflection unit, and the analysis and control unit is embodied to determine a point of incidence of measurement radiation incident on the second position-sensitive surface detector, the calibration device comprises a retroreflector, which is designed, in a two-dimensional region, independently of the point of incidence of the measurement radiation within the two-dimensional region, to generate an offset-free, coaxial retroreflection of measurement radiation incident thereon, or the calibration device comprises, on the base, a retroreflector and an optics assembly acting as a reducing objective, and, to determine the calibration parameters for the coordinate measuring device, can be targeted using the measurement radiation such that an optical beam path of the measurement radiation extends through the optics assembly and the measurement radiation is incident on the retroreflector, whereby:

a first calibration measurement can be carried out using a distance to the retroreflector which is simulated with respect to relevant measured variables for the determination of the calibration parameters, and the simulated distance is greater than an actual structurally provided distance to the retroreflector.

12. The coordinate measuring device according to claim 1, wherein:

the first bearing and/or the second bearing is/are embodied as fixed/free bearings.

13. The coordinate measuring device according to claim 12, wherein the laser module comprises a helium-neon laser furnace.

14. The method according to claim 13, wherein:
a measurement sequence, in the scope of which the support is rotated in relation to the base by means of a first motor about the first axis of rotation, wherein, by the analysis and control unit,
before the measurement sequence, inclination data of the two inclination sensors are captured and correlated with one another as initialization inclination data; and
during the measurement sequence, inclination data of the second inclination sensor are captured and correlated with the initialization inclination data for the purpose of self-monitoring and/or self-calibration of the coordinate measuring device during the measurement sequence.

15. The coordinate measuring device according to claim 1, wherein:
a laser module for generating a laser beam as measurement radiation, wherein the laser module is provided in the support and a polarization-maintaining optical waveguide system for transmitting light between the support and the beam deflection unit, wherein:
the optical waveguide system comprises a first fiber and a second fiber, which are connected to one another by a torsion-resistant plug connection, and/or
the first and the second fibers are single-mode fibers.

16. A system made of a coordinate measuring device, which is embodied claim 1, and a quick-release fastener unit for fastening the coordinate measuring device on a tripod, wherein:
at least one shock absorber for reducing shocks of the coordinate measuring device during a placement of the coordinate measuring device on the quick-release fastener unit, wherein the shock absorber acts between the quick-release fastener unit and a base of the coordinate measuring device.

17. A system according to claim 16, wherein the quick-release fastener unit comprises a first contact surface, the coordinate measuring device comprises a base having a second contact surface, and the first contact surface and the second contact surface are embodied and arranged to contact one another over the entire surface after the placement, wherein:
the shock absorber comprises a movable element for momentum absorption, which protrudes out of the first contact surface and/or the second contact surface and is embodied to enable contacting over the entire surface of the first contact surface and the second contact surface after the placement, wherein:
the movable element is a shock absorber piston rod,
the shock absorber is hydraulic, and/or
the system comprises at least three shock absorbers.

18. A method for measuring coordinates of a remote point by means of a coordinate measuring device, wherein the coordinate measuring device at least comprises:
a support, which is fastened on a base so it is rotatable about a first axis of rotation,
a beam deflection unit, which is fastened on the support so it is rotatable about a second axis of rotation, which is essentially orthogonal to the first axis of rotation,
a first bearing for the rotatable mounting of the beam deflection unit on the support, and
a second bearing for the rotatable mounting of the support on the base, wherein:
the beam deflection unit comprises an optical distance measuring device having at least one distance meter for measuring the distance to the measuring aid by means of measurement radiation,
the first bearing comprises a first angle encoder and the second bearing comprises a second angle encoder, and
a first inclination sensor is provided on the base, and wherein the method comprises:
an emission of the measurement radiation onto the retroreflector,
a reception of measurement radiation reflected from the retroreflector,
an ascertainment of a distance to the retroreflector on the basis of the reflected measurement radiation,
an ascertainment of an angle of the beam deflection unit in relation to the base, and
a capture of an inclination of the base in at least two essentially orthogonal directions in relation to the direction of gravity by means of a first inclination sensor, wherein:
a capture of an inclination of the support in at least two essentially orthogonal directions in relation to the direction of gravity by means of a second inclination sensor,
wherein the ascertainment of the angle of the beam deflection unit in relation to the base comprises an analysis of the inclination of the base and the inclination of the support.

* * * * *